(12) United States Patent  (10) Patent No.: US 7,703,146 B2
Shavit et al.  (45) Date of Patent: Apr. 20, 2010

(54) DYNAMIC COPY PROTECTION OF OPTICAL MEDIA

(75) Inventors: Eyal Shavit, Tel Aviv (IL); Philippe Selve, Moshav Heirut (IL); Ran Alcalay, Tel Aviv (IL)

(73) Assignee: Macrovision Europe Limited (GB)

( * ) Notice: Subject to any disclaimer, the term of this patent is extended or adjusted under 35 U.S.C. 154(b) by 1079 days.

(21) Appl. No.: 11/186,255

(22) Filed: Jul. 21, 2005

(65) Prior Publication Data
US 2005/0254384 A1 Nov. 17, 2005

Related U.S. Application Data

(62) Division of application No. 09/993,600, filed on Nov. 27, 2001, now Pat. No. 6,952,479.

(51) Int. Cl.
*G06F 11/00* (2006.01)
*G06F 17/30* (2006.01)
*H04N 7/16* (2006.01)

(52) U.S. Cl. ............... 726/31; 726/26; 726/32

(58) Field of Classification Search .......... 726/26, 726/31, 33
See application file for complete search history.

(56) References Cited

U.S. PATENT DOCUMENTS

| 5,381,392 | A | * | 1/1995 | Hira | .......... 369/53.23 |
| 5,513,260 | A | * | 4/1996 | Ryan | .......... 380/200 |
| 5,636,282 | A | | 6/1997 | Holmquist et al. | |
| 5,636,283 | A | | 6/1997 | Hill et al. | |
| 5,646,920 | A | | 7/1997 | Raczynski | |
| 5,661,715 | A | | 8/1997 | Blaukovitsch | |
| 5,699,434 | A | | 12/1997 | Hogan | |
| 5,706,261 | A | * | 1/1998 | Udagawa | .......... 369/30.03 |
| 5,930,209 | A | | 7/1999 | Spitzenberger et al. | |
| 5,956,408 | A | | 9/1999 | Arnold | |
| 6,005,839 | A | | 12/1999 | Sako et al. | |
| 6,104,679 | A | | 8/2000 | Sollish | |
| 6,253,258 | B1 | | 6/2001 | Cohen | |

(Continued)

FOREIGN PATENT DOCUMENTS

WO WO 99/63538 12/1999

OTHER PUBLICATIONS

"Modifying and Recompiling a Compiled Script", Apple Computer Inc., Jul. 7, 1996, pp. 1-2, retrieved from http://developer.apple.com/documentation/mac/Iac/Iac-337.html.

(Continued)

*Primary Examiner*—Christopher J Brown
(74) *Attorney, Agent, or Firm*—Andy T. Pho

(57) ABSTRACT

A method for copy protection includes receiving data in a recording module representing content to be recorded on a recording medium, the data including an indication that the content is to be protected from unauthorized copying. Responsive to the indication, the recording module signals a protection module to initiate a protection protocol in synchronization with the recording module. The protection module generates control information, so as to prevent the unauthorized copying of the content that is to be protected, and conveys the control information to the recording module, in accordance with the protocol. The recording module combines the control information with the data representing the content in the recording module, for recording on the recording medium.

22 Claims, 3 Drawing Sheets

U.S. PATENT DOCUMENTS

| | | | |
|---|---|---|---|
| 6,256,738 | B1 | 7/2001 | Sinquin et al. |
| 6,631,107 | B1 | 10/2003 | Ito et al. |
| 6,839,312 | B2 | 1/2005 | Heylen et al. |
| 6,842,522 | B1 | 1/2005 | Downing |
| 6,988,206 | B1 * | 1/2006 | Alcalay et al. ........... 369/275.5 |
| 7,028,011 | B1 | 4/2006 | Ha et al. |
| 7,203,834 | B1 | 4/2007 | Benayoun et al. |
| 7,356,142 | B1 | 4/2008 | Downing |
| 2001/0027509 | A1 | 10/2001 | Nishio |
| 2002/0126606 | A1 * | 9/2002 | Carson .................... 369/53.21 |
| 2002/0144114 | A1 * | 10/2002 | Barnard et al. .............. 713/166 |
| 2003/0084332 | A1 | 5/2003 | Krasinski et al. |
| 2004/0076294 | A1 * | 4/2004 | Shibata et al. ............. 380/201 |
| 2005/0027991 | A1 | 2/2005 | DiFonzo |

OTHER PUBLICATIONS

"Scripting language", Wikipedia, Aug. 9, 2006, pp. 1-5, retrieved from http://en.wikipedia.org/wiki/Scripting_language.

Patent Abstracts of Japan, Publication No. 2001-202694, published Jul. 27, 2001, Mitsubishi Chemicals Corp, 2 pgs.

Patent Abstracts of Japan, Publication No. 2000-286839, published Oct. 13, 2000, Ricoh Co Ltd, 2 pgs.

Patent Abstracts of Japan, Publication No. 2000-155943, published Jun. 6, 2000, Ricoh Co Ltd, 2 pgs.

Patent Abstracts of Japan, Publication No. 08-031080, published Feb. 2, 1996, Kenwood Corp, 2 pgs.

Patent Abstracts of Japan, Publication No. 2000-048478, published Feb. 18, 2000, Yamaha Corp, 2 pgs.

Patent Abstracts of Japan, Publication No. 2000-011536, published Jan. 14, 2000, Fujitsu Ten Ltd, 1 pg.

Patent Abstracts of Japan, Publication No. 11-003568, published Jan. 6, 1999, Victor Co of Japan Ltd, 2 pgs.

Patent Abstracts of Japan, Publication No. 08-212681, published Aug. 20, 1996, Matsushita Electric Ind Co Ltd, 2 pgs.

* cited by examiner

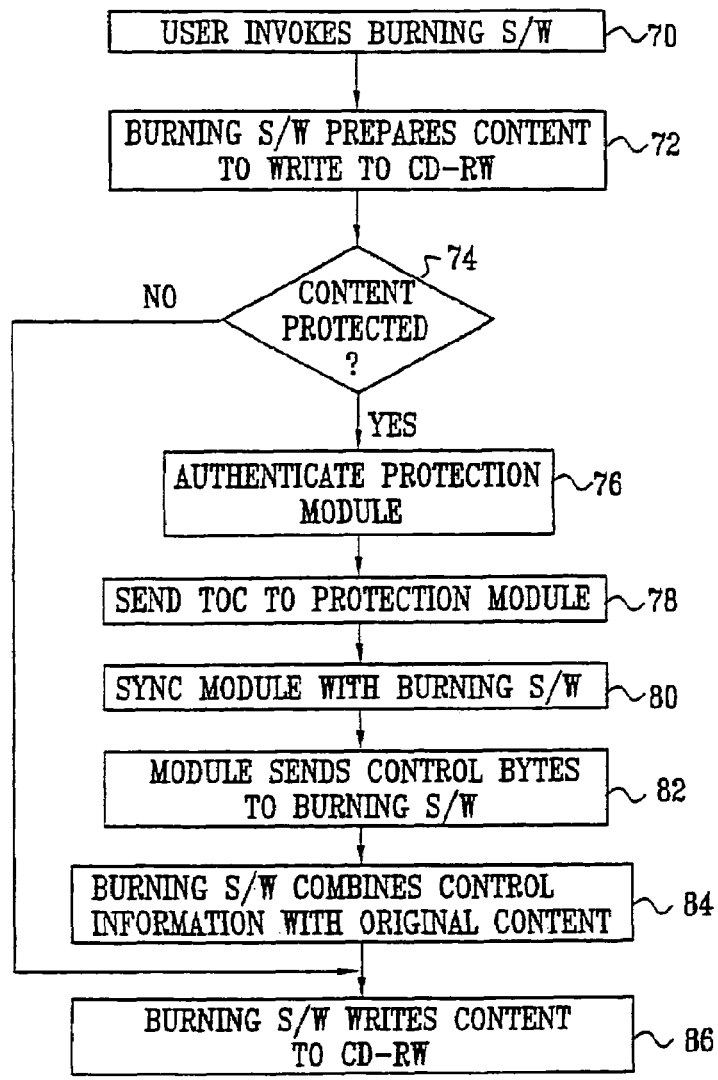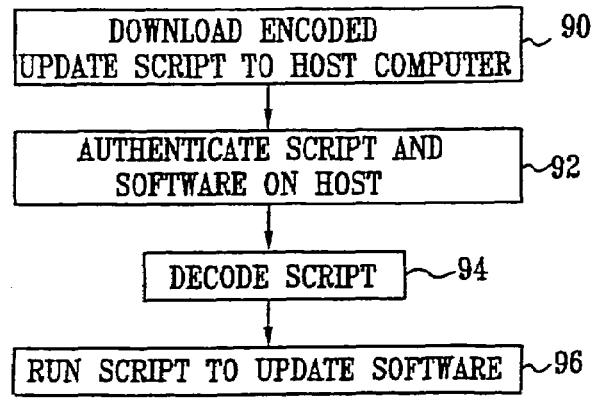

DYNAMIC COPY PROTECTION OF OPTICAL MEDIA

CROSS REFERENCE TO RELATED APPLICATION

This application is a divisional application of U.S. application Ser. No. 09/993,600 filed Nov. 27, 2001, now U.S. Pat. No. 6,952,479, the disclosure of which is herein incorporated by reference in its entirety.

FIELD OF THE INVENTION

The present invention relates generally to protection of intellectual property rights, and specifically to prevention of unauthorized copying of recorded audio media.

BACKGROUND OF THE INVENTION

Compact disk (CD) recordings are a preferred means for distributing both digital audio recordings and computer software. CD digital audio (CD-DA) recordings are almost universally made in accordance with standard 908 of the International Electrotechnical Commission (IEC), entitled "Compact Disc Digital Audio System" (Geneva, Switzerland, 1987), which is incorporated herein by reference. The 908 standard, also known as the Red Book, defines how audio data are to be encoded and recorded on the disk, enabling the data to be played back using standard digital decoding chips.

In accordance with the Red Book standard, the data on the CD are recorded in blocks (or sectors) of 98 frames, each such frame comprising one control symbol followed by thirty-two data symbols. Each symbol comprises fourteen channel bits, which correspond to a single byte of binary input data, encoded in a process of eight-to-fourteen bit modulation (known as "EFM" modulation). The data symbols include error correction codes, known as Cross Interleave Reed Solomon Codes (CIRC), which are used during playback to identify and, when possible, to correct errors in the corresponding data segments. The control symbols contain sub-code information for the block, arranged in channels that are identified in the standard as P, Q, R, S, T, U, V and W. The first two sub-code symbols contain synchronization patterns known as S0 and S1. The blocks are organized sequentially in tracks, beginning with a lead-in track 0, followed by up to 99 audio tracks. The P and Q sub-code channels contain timing and navigation information for the tracks. The Q channel in the lead-in contains the Table Of Contents (TOC) of the disk.

Different standards apply to other types of data, such as computer software, which may be recorded on CD, as well. For example, the Blue Book standard specifies multi-session recordings, that combine audio and other data on a single disk. The Orange Book applies generally to recordable CDs (CD-R), including rewritable CDs (CD-RW), which allow users to write, erase, overwrite and read CD information using properly-configured recording and playback equipment. The CD-RW format permits both audio and data recording. It is described in detail in part II of the Orange Book, which is entitled "Compact Disc ReWritable System Description" (Tentative Version 1.90, June, 1997), published by Philips Consumer Electronics B.V. (Eindhoven, Netherlands), which is incorporated herein by reference.

Inexpensive CD recording devices and read/write media that comply with Orange Book requirements have become available to consumers. Thus, it is now easy, using a conventional personal computer with a CD burner, to make exact, digital copies of all types of CDs. The CD content is read out by the computer, byte by byte, from one CD, typically a legitimately-purchased original CD, and then written to a blank CD-R or CD-RW so as to make a pirate copy. Similar copying methods may be used with other media, such as Digital Video Disks (DVD). Off-shelf software to assist the user in making such copies is also widely available. For example, Roxio™ Inc. (Milpitas, Calif.) offers "Easy CD Creator" software, which is commonly bundled with CD burners sold on the consumer market. Such software typically contains no program safeguards to prevent users from making unauthorized copies of copyright material. Financial losses to the recording and software industries due to such pirate copying are estimated to be in the billions of dollars.

Various methods are known in the art for protecting CD audio content from being copied using computer CD drives. Some of these methods are based on manipulating the sub-code control information. For example, PCT patent publication WO 01/61696, whose disclosure is incorporated herein by reference, describes a method for copy protection of digital audio CDs based on using a non-standard number of frames in a sector of a compact audio disk, for example, 99 rather than the usual 98 frames specified by the standard. The S0 and S1 sub-code synchronization patterns are therefore displaced one frame later than they would normally be, without changing the data in the frames. As another example, PCT patent publication WO 00/74053, whose disclosure is likewise incorporated herein by reference, describes a copy protection method based on rendering certain of the sub-code information, particularly in the Q channel, incorrect and/or inaccurate. The incorrect data is ignored by an audio CD player, but renders the disk unplayable by a computer CD drive.

Other methods of copy protection involve changing the audio content of the original disk. For example, PCT patent publication WO 01/41130, whose disclosure is incorporated herein by reference, describes such a method based on incorporating a pattern of latent noise into a digital audio CD by overwriting some of the original audio signal data symbols with grossly-erroneous values. The corresponding error-correction symbols are overwritten in such a way as to create an uncorrectable error in the frames containing the erroneous values. An ordinary CD player, when playing such a disk, will detect each occurrence of a latent noise value as an uncorrectable error and will apply interpolative error-concealment to prevent the output of the error. When a computer CD drive attempts to read the disk, however, and detects the intentional, uncorrectable errors, it will either read no data at all or read only the raw uncorrected data, including the latent noise.

One way in which CD-RW disks used to produce unauthorized copies of copyright material differ from CD-DA and other types of non-rewritable disks is that they typically contain a Program Memory Area (PMA), preceding the conventional Lead-In Area of the disk. The PMA is used for intermediate storage of control information during the process of recording the disk. This information includes:

Disk contents—track numbers and their start and stop times.

Disk identification.

Skip information—indicating audio tracks or parts of audio tracks to skip during playback.

When the entire disk is finalized, the information in the PMA is encoded in the sub-code Q channel of the lead-in, and the PMA is erased. It is not necessary that the disk be finalized, however, in order for its contents to be played back. Most currently-available CD drives are designed for CD-RW compatibility and therefore are programmed to read and use any PMA information on the disk before going on to the lead-in and program areas of the disk. Only in Disk-At-Once (DAO) CD-RW recordings, in which the entire disk contents are copied in one operation, is the sub-code Q channel information written to the disk directly, without going through the PMA. Thus, DAO recordings, such as those made in manufacturing plants, conventionally have no PMA. CD-DA players ignore the PMA in any event.

SUMMARY OF THE INVENTION

It is an object of some aspects of the present invention to provide improved methods and apparatus for preventing unauthorized copying of recorded, computer-readable media, and particularly of compact disks.

It is a further object of some aspects of the present invention to provide compact disks that are resistant to unauthorized copying and methods and apparatus for producing such disks.

It is still a further object of some aspects of the present invention to provide methods for updating copy-protection of equipment and software used to produce recorded media, in order to frustrate efforts to decipher the copy-protection mechanisms of the media.

In preferred embodiments of the present invention, a protection module is added to CD recording equipment. The module may be implemented as a hardware unit or as a software program, or as a combination of hardware and software elements. It is used to modify portions of the data to be recorded on a CD in such a way as to inhibit subsequent readout and copying of the contents (typically audio data) of the CD using a computer CD drive. Various types of modifications may be applied individually or in combination, including modifications to the disk layout, control information, content data and symbols recorded on the disk. Preferably, the modifications are such as to create errors in accessing the Red Book CD content using the computer CD drive, or to prevent such access altogether, while allowing a Red Book CD-DA player to play the contents without noticeable difficulty or degradation.

In some preferred embodiments of the present invention, the module operates by generating erroneous control information for writing to the Program Memory Area (PMA) of a CD. The PMA may be made to indicate, for example, that there is no audio session on the disk, or that certain tracks or time intervals in the audio session should be skipped, or that some tracks are hidden tracks or are incompletely recorded. The modifications to the content of the PMA may be used to copy-protect all the Red Book content on the disk or only certain tracks on the disk. When the CD is inserted in a CD-RW compatible computer drive, the drive first attempts to access the PMA, as required by the Orange Book standard. The control information in the PMA prevents the drive from properly reading out the audio content on the disk. A Red Book-compliant CD-DA player, however, ignores the PMA and plays the disk without difficulty. Preferably, the CD is written in Disk-At-Once (DAO) mode, so that none of the data on the disk can subsequently be overwritten without overwriting the entire disk.

In some of these preferred embodiments, the PMA is added to disks that are manufactured in a plant using the DAO method, even though such disks are not rewritable disks. The PMA would normally not exist at all in such disks, but is added in these embodiments so as to inhibit or control access to Red Book content by unauthorized computer CD drives. In other preferred embodiments, a software protection module is used to modify the PMA control information while writing to a CD-RW disk, so that when the disk is closed, and the PMA information is transferred to the lead-in area, the disk is copy-protected. For this purpose, control information may be written to the reserved track within the PMA (as specified in the Orange Book), or an incomplete track structure may be created in the PMA.

In other preferred embodiments of the present invention, the module changes the layout of the disk by adding multiple sessions to the disk, and modifying the control information in the multiple sessions (for example, in the lead-in of the sessions) so that the information conveyed in the multiple sessions (individually or taken together) blocks unauthorized copying. While a computer CD drive is sensitive to multiple sessions and their order and layout on the disk, CD audio players read only the first audio session.

In still other preferred embodiments of the present invention, the module modifies other aspects of the data recorded on the disk. For example, the module may desynchronize the EFM pattern on the disk, preferably by inverting the order of and repositioning the S0 and S1 bytes relative to one another in the synchronization pattern in each of a plurality of sectors on the disk. In such sectors, for example, S1 appears in the synchronization pattern before S0 and, furthermore, S0 and S1 are no longer in consecutive positions as specified in the standard. (The number of frames in each sector, however, is preferably unchanged from the standard 98 frames, in contrast to the method described in the above-mentioned WO 01/61696 PCT publication.) Again, while CD audio players are capable of playing back the audio content of the disk even when the synchronization pattern is broken, computer CD drives are typically unable to read out the content under such circumstances.

The preferred embodiments described above typically prevent computer CD drives from accessing the original audio content. To enable an authorized computer user to play back this content using the computer drive, the audio content is preferably replicated in a compressed, protected form. The replica is placed, either hidden or exposed, in another location on the disk or in a separate data session to which computer drives are granted access. Some methods for encoding the audio data in this manner and for providing authorized access to the encoded data are described in PCT patent publication WO 01/80546, whose disclosure is incorporated herein by reference.

In some preferred embodiments of the present invention, the protection module comprises a software module, which is designed to work in conjunction with CD recording software on a personal computer (PC). In one such embodiment, when the recording software receives content to be recorded, it checks the content to determine whether the user is authorized to make the copy and, if so, whether the area of the CD on which the copy is recorded should itself be copy-protected. The indication as to whether and under what conditions the content can be copied is preferably provided by means of digital rights management (DRM) known in the art, which are beyond the scope of the present invention. Upon determining that copy protection should be applied to the contents on the CD, the recording software signals the protection module and passes certain control data to the protection module, such as track information to be recorded in the lead-in area of a single- or multi-session disk, or the Table of Contents (TOC) of the disk.

The recording software and the protection module use a predetermined protocol for mutual identification and for synchronizing the protection module with the content to be recorded on the CD. There is no need, however, for the actual content itself to be passed to the protection module, nor is it necessary that the recording software be modified to carry out any particular protection algorithm. Rather, the protection module generates synchronization information and modified control information and passes it to the recording software. The recording software combines this control information with the content of the disk and drives a CD burner to record the combined information and content. The changes in the control information on the disk preferably render the protected content inaccessible to a computer CD drive, as mentioned above. These changes may include, for example, the addition of PMA errors, as mentioned above, or the introduction of errors in the sub-code Q channel, as described in U.S. patent application Ser. No. 09/549,820, which is assigned to the assignee of the present patent application and is incorporated herein by reference, or as otherwise known in the art.

In some preferred embodiments of the present invention, the protection algorithms applied by the protection module are periodically updated by downloading a script over a communication link or on a removable storage medium to the module. The script includes new parameters or other modifications to be applied in the protection algorithm. After performing a suitable authentication procedure, the module opens and runs the script, causing its protection algorithm to be updated accordingly. This simple, on-line procedure allows the provider and users of the protection module to update the operation of the module at close intervals and thus to stay a step ahead of hackers seeking to decipher the protection algorithm and make unauthorized copies of the content.

Although preferred embodiments are described herein with specific reference to recording of audio content on compact disks, the methods described herein may similarly be applied, mutatis mutandis, to other types of content and recording media. The necessary modifications to these methods will be apparent to those skilled in the art. More particularly, although reference is made herein to particular types of CDs and CD standards, the principles of the present invention may be extended to other CD types and standards. The terms "compact disk" and "CD," when used in the present patent application and in the claims, should therefore be taken to refer, as appropriate in context, to substantially all members of the CD family, including digital video disks (DVD).

There is therefore provided, in accordance with a preferred embodiment of the present invention, a method for preventing copying of a compact disk (CD) using an unauthorized readout device, the method including:

preparing content to be written to a session in a Program Area of the CD;

generating control information for writing to a Program Memory Area (PMA) of the CD, which control information, when read by the unauthorized readout device, renders the unauthorized readout device incapable of properly reading the session from the CD; and recording the content and the control information on the CD.

Preferably, recording the content and the control information includes making the recording in a Disk At Once (DAO) mode, wherein the CD is not a rewritable CD.

Further preferably, generating the control information includes inserting erroneous data in the PMA. Most preferably, inserting the erroneous data includes inserting parameters instructing a Compact Disk Rewritable (CD-RW) compatible readout device to skip one or more tracks of the content on the CD, or to skip the content in one or more time intervals in one or more tracks on the CD. Additionally or alternatively, inserting the erroneous data includes inserting parameters indicating that a track on the CD is incomplete or identifying an audio track on the CD as a digital mode track.

There is also provided, in accordance with a preferred embodiment of the present invention, a method for preventing copying of a compact disk (CD) using an unauthorized readout device, the method including:

preparing a first Table Of Contents (TOC) with respect to an audio session to be recorded on the CD, the first TOC referring to track numbers and modes in the audio session;

preparing a second TOC with respect to a data session to be recorded on the CD, the second TOC referring to the same track numbers and modes as the first TOC; and recording the audio and data sessions on the CD together with the first TOC and the second TOC.

Preferably, preparing the first TOC includes recording timing information with respect to the track numbers and/or modes, and preparing the second TOC includes modifying the timing information recorded in the first TOC, and recording the modified timing information with respect to the same track numbers in the second TOC. Alternatively or additionally, the first TOC indicates that one or more of the tracks are audio mode tracks, and preparing the second TOC includes indicating in the second TOC that the one or more tracks are not audio mode tracks.

There is additionally provided, in accordance with a preferred embodiment of the present invention, a method for preventing copying of a compact disk (CD) using an unauthorized readout device, the method including:

preparing data to be written to a sector of the CD, the sector including a predetermined number of frames in accordance with an applicable standard, each of the frames including multiple symbols, such that in accordance with the applicable standard, each of the frames is to begin with first and second synchronization symbols;

arranging the symbols in at least one of the frames so that the second synchronization symbol occurs before the first synchronization symbol or subcode symbol; and recording the symbols in the sector on the CD.

Preferably, the first and second synchronization symbols in the at least one of the frames are arranged so that the at least one of the frames does not begin with either the first or the second synchronization symbol. Additionally or alternatively, the symbols are arranged in at least one of the frames so that the first and second synchronization symbols are not in consecutive positions. Most preferably, the applicable standard includes standard 908 of the International Electrotechnical Commission, such that the predetermined number of the frames in the sector is 98, and the first and second synchronization symbols include sub-code symbols S0 and S1.

There is further provided, in accordance with a preferred embodiment of the present invention, a method for copy protection, including:

receiving data in a recording module representing content to be recorded on a recording medium, the data including an indication that the content is to be protected from unauthorized copying;

responsive to the indication, signaling a protection module to initiate a protection protocol in synchronization with the recording module;

generating control information using the protection module so as to prevent the unauthorized copying of the content that is to be protected;

conveying the control information from the protection module to the recording module, in accordance with the protocol;

combining the control information with the data representing the content in the recording module; and recording the data combined with the control information on the recording medium.

Preferably, the control information includes sub-code information. Alternatively or additionally, signaling the protection module includes conveying sub-code channel information for use by the protection module in generating the control information. Further preferably, the control sub-code channel information includes a table of contents (TOC) of the data representing the content. Most preferably, generating the control information includes generating the control information responsive to the sub-code channel information, substantially without receiving the data representing the content at the protection module.

Additionally or alternatively, signaling the protection module includes sending a synchronization signal from the recording module to the protection module, and conveying the control information includes generating the control information in synchronization with the data, responsive to the synchronization signal. Further additionally or alternatively, signaling the protection module includes authenticating the protection module before proceeding with the protection protocol.

Preferably, generating the control information includes preparing the control information so as to cause the recording module, upon combining the control information with the data, to effect logical changes in a sub-code channel associated with the data. Additionally or alternatively, generating the control information includes preparing the control information so as to cause the recording module, upon combining the control information with the data, to modify the data so that at least a portion of the data will be identified as erroneous with respect to an error correcting code associated therewith.

In a preferred embodiment, the recording medium includes a compact disk (CD).

There is moreover provided, in accordance with a preferred embodiment of the present invention, a method for copy protection, including:

providing a protection module for processing data associated with content to be recorded on a recording medium, so as to inhibit, by processing of the data, unauthorized copying of the content;

conveying a script to the protection module over a communication link or any other means, the script providing an updated processing parameter for use in processing the data;

running the script at the protection module to determine the updated processing parameter;

processing the data using the protection module subject to the updated processing parameter; and recording the processed data on the medium.

In a preferred embodiment, the protection module includes a hardware logic unit dedicated to processing the data so as to inhibit the unauthorized copying. In another preferred embodiment, the protection module includes software program code for running on a general-purpose processing unit.

Preferably, conveying the script includes encrypting the script before downloading it to the protection module, and running the script includes authenticating and decrypting the script.

Further preferably, processing the data includes effecting logical changes in a sub-code channel associated with the data.

There is furthermore provided, in accordance with a preferred embodiment of the present invention, apparatus for preventing copying of a compact disk (CD) using an unauthorized readout device, the apparatus including:

a protection processor, adapted to prepare content to be written to a session in a Program Area of the CD, and to generate control information for writing to a Program Memory Area (PMA) of the CD, which control information, when read by the unauthorized readout device, renders the unauthorized readout device incapable of properly reading the session from the CD; and a recording device, coupled to receive the content and the control information from the protection processor and adapted to record the content and the control information on the CD.

There is also provided, in accordance with a preferred embodiment of the present invention, apparatus for preventing copying of a compact disk (CD) using an unauthorized readout device, the apparatus including:

a protection processor, adapted to prepare a first Table Of Contents (TOC) with respect to an audio session to be recorded on the CD, the first TOC referring to track numbers in the audio session and/or their modes, and to prepare a second TOC with respect to a data session to be recorded on the CD, the second TOC referring to the same track numbers as the first TOC; and a recording device, coupled to receive the first TOC and the second TOC from the protection processor, and to record the audio and/or additional sessions (data or audio) on the CD together with the first TOC and the second TOC.

There is additionally provided, in accordance with a preferred embodiment of the present invention, apparatus for preventing copying of a compact disk (CD) using an unauthorized readout device, the apparatus including:

a protection processor, adapted to receive data to be written to a sector of the CD, the sector including a predetermined number of frames in accordance with an applicable standard, each of the frames including multiple symbols, such that in accordance with the applicable standard, each of the frames is to begin with first and second synchronization symbols, the protection processor being adapted to arrange the symbols in at least one of the frames so that the second synchronization symbol occurs before the first synchronization symbol and the synchronization symbols are preferably no longer consecutive; and a recording device, coupled to receive the symbols from the protection processor, and to record the symbols in the sector on the CD.

There is further provided, in accordance with a preferred embodiment of the present invention, apparatus for copy protection, including:

a protection module, adapted to generate control information using the protection module so as to prevent unauthorized copying of protected content; and a recording module, adapted to receive data representing the content to be recorded on a recording medium, the data including an indication that the content is to be protected from the unauthorized copying, such that responsive to the indication, the recording module signals the protection module to initiate a protection protocol in synchronization with the recording module and conveys the control information from the protection module to the recording module, in accordance with the protocol, and then receives the control information generated by the protection module and combines the control information with the data representing the content, so as to record the data combined with the control information on the recording medium.

There is moreover provided, in accordance with a preferred embodiment of the present invention, apparatus for copy protection, including:

a network interface, adapted to download a script over a communication link, the script providing an updated processing parameter for use in processing data associated with content to be recorded on a recording medium so as to inhibit unauthorized copying of the content;

a protection module, adapted to run the script so as to determine the updated processing parameter and to process the data, subject to the updated processing parameter, so as to inhibit the unauthorized copying; and a recording device, coupled to receive the processed data from the protection module, and to record the processed data on the medium.

Alternatively, the apparatus may comprise a data input interface of another type, such as a removable disk or diskette drive, for receiving the script file on tangible media or by other means.

There is furthermore provided, in accordance with a preferred embodiment of the present invention, a computer software product for preventing copying of a compact disk (CD) using an unauthorized readout device, the product including a computer-readable medium in which program instructions are stored, which instructions, when read by a computer, cause the computer to prepare content to be written to a session in a Program Area of the CD, and to generate control information for writing to a Program Memory Area (PMA) of the CD, which control information, when read by the unauthorized readout device, renders the unauthorized readout device incapable of properly reading the session from the CD.

There is also provided, in accordance with a preferred embodiment of the present invention, a computer software product for preventing copying of a compact disk (CD) using an unauthorized readout device, the product including a computer-readable medium in which program instructions are stored, which instructions, when read by a computer, cause the computer to prepare a first Table Of Contents (TOC) to be recorded on the CD with respect to an audio session, the first TOC referring to track numbers in the audio session, and to prepare a second TOC to be recorded on the CD with respect to a data session, the second TOC referring to the same track numbers as the first TOC.

There is additionally provided, in accordance with a preferred embodiment of the present invention, a computer software product for preventing copying of a compact disk (CD) using an unauthorized readout device, the product including a computer-readable medium in which program instructions are stored, which instructions, when read by a computer that receives data to be written to a sector of the CD, the sector including a predetermined number of frames in accordance with an applicable standard, each of the frames including multiple symbols, such that in accordance with the applicable standard, each of the frames is to begin with first and second synchronization symbols, cause the computer to arrange the symbols in at least one of the frames to be recorded to the sector of the CD so that the second synchronization symbol occurs before the first synchronization symbol. Preferably, the rearranged synchronization symbols are no longer consecutive.

There is further provided, in accordance with a preferred embodiment of the present invention, a computer software product including a computer-readable medium in which program instructions are stored, which instructions, when read by a computer, cause the computer to run a protection process and a recording process, wherein the protection process generates control information so as to prevent unauthorized copying of protected content, and wherein the recording module receives data representing the content to be recorded on a recording medium, the data including an indication that the content is to be protected from the unauthorized copying, such that responsive to the indication, the recording module signals the protection module to initiate a protection protocol in synchronization with the recording module and conveys the control information from the protection module to the recording module, in accordance with the protocol, and then receives the control information generated by the protection module and combines the control information with the data representing the content, so as to record the data combined with the control information on the recording medium.

There is moreover provided, in accordance with a preferred embodiment of the present invention, a computer software product including a computer-readable medium in which program instructions are stored, which instructions, when read by a computer, cause the computer to download a script over a communication link, or to receive it by other means, the script providing an updated processing parameter for use in processing data associated with content to be recorded on a recording medium so as to inhibit unauthorized copying of the content, and further cause the computer to run the script so as to determine the updated processing parameter and to process the data for recording on the medium, subject to the updated processing parameter.

There is furthermore provided, in accordance with a preferred embodiment of the present invention, a data storage medium that is resistant to copying using an unauthorized readout device, the medium including a compact disk (CD) having a Program Area in which content is stored, and a Program Memory Area (PMA) containing control information which, when read by the unauthorized readout device, renders the unauthorized readout device incapable of properly reading the session from the CD.

There is also provided, in accordance with a preferred embodiment of the present invention, a data storage medium that is resistant to copying using an unauthorized readout device, the medium including a compact disk (CD) that is not a rewritable CD, the CD having a Program Area in which content is stored, and a Program Memory Area (PMA) containing control information.

There is additionally provided, in accordance with a preferred embodiment of the present invention, a data storage medium that is resistant to copying using an unauthorized readout device, the medium including a compact disk (CD) having an audio session and a second session, which may be either an audio or a data session. The audio session including a first Table Of Contents (TOC) referring to track numbers in the audio session and/or their modes, and the second session including a second TOC referring to the same track numbers as the first TOC.

There is further provided, in accordance with a preferred embodiment of the present invention, a data storage medium that is resistant to copying using an unauthorized readout device, the medium including a compact disk (CD) containing data in at least one sector thereon, the at least one sector including a predetermined number of frames in accordance with an applicable standard, each of the frames including multiple symbols, such that in accordance with the applicable standard, each of the frames is to begin with first and second synchronization symbols, while in at least one of the frames in the at least one sector, the second synchronization symbol occurs before the first synchronization symbol and the synchronization signals are no longer consecutive.

The present invention will be more fully understood from the following detailed description of the preferred embodiments thereof, taken together with the drawings in which:

BRIEF DESCRIPTION OF THE DRAWINGS

FIG. 4 is a flow chart that schematically illustrates a method for applying copy protection to a CD recording, in accordance with a preferred embodiment of the present invention; and FIG. 5 is a flow chart that schematically illustrates a method for updating a copy protection module, in accordance with a preferred embodiment of the present invention.

DETAILED DESCRIPTION OF PREFERRED EMBODIMENTS

Figure 1:
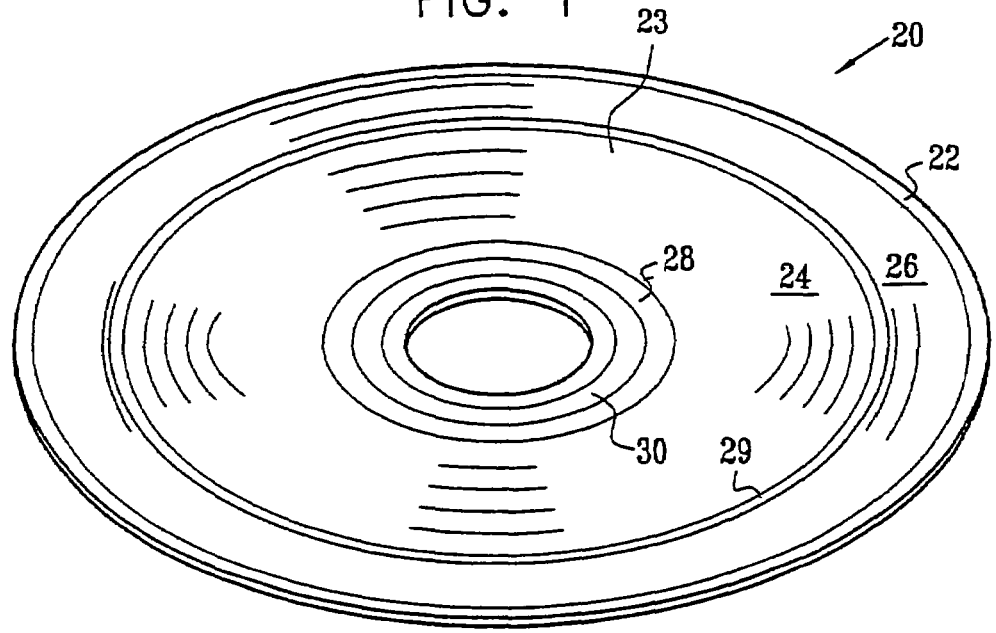
FIG. 1 is a schematic, pictorial illustration of a compact disk (CD), in accordance with a preferred embodiment of the present invention.

Reference is now made to FIG. 1, which is a schematic pictorial view of a rewritable compact disk (CD-RW) 20, which is protected against unauthorized copying, in accordance with a preferred embodiment of the present invention. The overall layout of disk 20 follows standard recording practice, as specified in the above-mentioned Orange Book standard. An information area 22 includes a program area (PA) 23, which may typically include multiple sessions. Information area 22 progresses outwards in a widening spiral, and contains all of the recorded contents of CD 20. In the present example, for the sake of simplicity, PA 23 is shown as including an audio session 24 and a data session 26, although typically a Blue Book or Orange Book disk may contain multiple data sessions. Audio session 24 consists of up to 99 tracks of audio content (such as music), as well as accompanying sub-code information.

Audio session 24 is preceded by a lead-in (LI) area 28, and followed by a lead-out (LO) area 29. (Data session 26 likewise has LI and LO areas, but they are omitted from the figure for the sake of simplicity of illustration.) Lead-in area 28 and lead-out area 29 both contain P and Q channels, which include timing and track information used during playback of CD 20, as noted above. At the beginning of information area 22, a Program Memory Area (PMA) 30 precedes LI 28. According to the Orange Book, PMA 30 begins 13:25 sec before LI 28, measured in terms of a standard time code known as Absolute Time In Pre-groove (ATIP). The PMA preferably contains data modifications intended to inhibit reading of PA 23 (and particularly of audio session 24) by unauthorized computer CD drives. Exemplary modifications to PMA 30 are described in detail hereinbelow.

Preferred embodiments of the present invention provide a number of different, complementary techniques for modifying the data in CD 20 in order to frustrate pirate copiers. Generally speaking, the modifications fall into the following categories:

General disk layout modifications—for example, recording several sessions on an audio CD. The second or third session can be used to mislead personal computers (PCs) that are commonly used in pirate copying, typically by adding conflicting pointers in the lead-in of the second session. These pointers can generate a conflict as to the actual position of the tracks on the disk or as to their type (for example, with two pointers referring to the same track, once as an audio mode track and once as data mode track, or alternatively two pointers to the same track showing different start positions for the track).

Optionally, the last session on the CD is a data session that contains the music in compressed form. Preferably, the music is encrypted in that session so as to enable playback directly from the disk and/or encoded using digital wrapper technology (also known as digital rights management—DRM) to enable download and playback through secure software from the disk of an authorized user. Such modifications are described in the above-mentioned U.S. patent application Ser. No. 09/549,820 and PCT patent publication WO 01/80546.

Modifications of the audio data, by insertion of noise, preferably as described in U.S. patent application Ser. No. 09/370,813, filed Aug. 9, 1999, which is assigned to the assignee of the present patent application, and whose disclosure is incorporated herein by reference.

Modifications of logical and control information, such as the sub-code information, particularly in the Q channel. These modifications may include, for example, changing the absolute or relative time, index pointers, table of contents (TOC) information (listing too many or too few tracks, or misleading pointers between multiple sessions), control byte modifications, pregap length manipulation. They are described in greater detail in the above-mentioned U.S. patent application Ser. No. 09/549,820 and PCT patent publication WO 01/80546. Further modifications to the synchronization control bytes (S0, S1), TOC and PMA information are described in detail hereinbelow.

Low-level modifications to the structure of the bits recorded on the CD. Such modifications are described in detail in the above-mentioned U.S. patent application Ser. No. 09/370,813 and in U.S. Pat. No. 6,256,738, whose disclosure is incorporated herein by reference. They typically involve recording sequences of bits on the CD that cause hardware errors in some CD-ROM drives used in PCs, or prevent them from interpolating over erroneous audio data. Alternatively or additionally, bit sequences may be recorded on the CD that do not appear in the conventional eight-to-fourteen bit (EFM) lookup table specified by the Red Book standard. Further alternatively or additionally, the bits used as synchronization signals may be changed, as described in greater detail hereinbelow.

These modifications may be used in CD 20 in different combinations, depending on application needs.

Table I below shows exemplary modifications that can be made to the track and timing information in the sub-code Q channel of the PMA, in accordance with a preferred embodiment of the present invention. The leftmost column in the table identifies the frame number of the data within the PMA, while the meanings of the other fields are described below the table. It is assumed that program area 23 of the disk contains five audio tracks. Further details of the parameters and encoding used in the PMA sub-code Q channel are presented in section V.4.3 of the above-mentioned CD-RW System Description. Due to lack of space, not all the actual Q channel parameters are shown in the table below, but the additional parameters that are required will be apparent to hose skilled in the art.

TABLE I

SAMPLE PMA CONTENT

| Frm No. | CTR/ ADR | Pt | MIN | SEC | FRM | Zero | PMIN | PSEC | PFRM |
|---|---|---|---|---|---|---|---|---|---|
| 1 | 02 | 00 | 20 | 15 | 14 | 00 | 00 | 00 | 00 |
| . | . | . | . | . | . | . | . | . | . |
| . | . | . | . | . | . | . | . | . | . |
| 29 | 01 | 04 | 37 | 50 | 18 | 06 | 30 | 19 | 52 |
| 30 | 01 | 04 | 37 | 50 | 18 | 07 | 30 | 19 | 52 |
| 31 | 01 | 04 | 37 | 50 | 18 | 08 | 30 | 19 | 52 |
| 32 | 01 | 04 | 37 | 50 | 18 | 09 | 30 | 19 | 52 |
| 33 | 03 | 01 | 02 | 03 | 04 | 00 | 00 | 00 | 00 |
| 34 | 03 | 01 | 02 | 03 | 04 | 01 | 00 | 00 | 00 |
| 35 | 03 | 01 | 02 | 03 | 04 | 02 | 00 | 00 | 00 |
| 36 | 03 | 01 | 02 | 03 | 04 | 03 | 00 | 00 | 00 |
| 37 | 03 | 01 | 02 | 03 | 04 | 04 | 00 | 00 | 00 |
| 38 | 05 | 01 | 05 | 45 | 67 | 05 | 05 | 42 | 67 |
| 39 | 05 | 01 | 05 | 45 | 67 | 06 | 05 | 42 | 67 |
| 40 | 05 | 01 | 05 | 45 | 67 | 07 | 05 | 42 | 67 |
| 41 | 05 | 01 | 05 | 45 | 67 | 08 | 05 | 42 | 67 |
| 42 | 05 | 01 | 05 | 45 | 67 | 09 | 05 | 42 | 67 |
| . | . | . | . | . | . | . | . | . | . |
| . | . | . | . | . | . | . | . | . | . |
| . | . | . | . | . | . | . | . | . | . |

The following items appear in the above encoded data:

Frames 1-32 of the PMA use normal encoding. The CONTROL (CTR in the table) field is set to zero throughout. The track number (TNO—not shown in the table) is also set to zero in the PMA. In frame 1, ADR=2 indicates that this frame contains the "disk identification" item. The identification number itself is given in the MIN, SEC and FRAME (FRM) fields, i.e., 201514 in the present example. It serves as a basis for disk authentication and may be used, for example, by a dedicated audio player to validate that the current disk is an original disk. For this purpose, a unique ID number is preferably imprinted in the PMA at the time of manufacture of the disk (although as noted above, original disks manufactured in a plant do not normally have a PMA) If a CD-RW copy of the disk is made using a CD burner, the ID of the PMA in the copy will not be the same as in the original disk.

In frames 29-32, ADR=1 indicates that these frames contain Table Of Contents (TOC) items. Each item includes a track number, indicated by the Pointer (Pt) field, and the start-times (PMIN, PSEC, PFRAME) and stop-times (MIN, SEC, FRAME) of the tracks. The ZERO field gives a synchronization count mandated by CD standards.

Frames 33-37 indicate that tracks 2, 3 and 4 are to be skipped. ADR=3 marks a "skip track" item, while Pointer=1 identifies this as the first skip track assignment in the PMA. The values 02, 03 and 04 in the MIN, SEC and FRAME fields indicate that tracks 2, 3 and 4 are to be skipped.

Frames 38-42 indicates that a three-second time interval is to be skipped. ADR=5 marks a "skip time interval" item, and Pointer=1 identifies this interval as the first one skipped. PMIN, PSEC and PFRAME give the start time of the interval as 05:42:67, while MIN, SEC and FRAME give the end time as 05:45:67.

A CD-RW compatible computer CD drive will read the control information in the PMA and will accordingly skip tracks 2, 3 and 4 and omit the content in these tracks. A conventional CD-DA player, however, will ignore the PMA information and will play the disk normally. Other possible PMA modifications will be apparent to those skilled in the art. For example, the PMA may include misleading pointers to certain tracks on the disk, which will cause a conflict when a CD-RW compatible drive attempts to access the disk.

When modifications are introduced in PMA 30, disk 20 is preferably recorded in the DAO writing mode, in which the entire disk contents are written in a single action. Details of the DAO mode are provided in the above-mentioned CD-RW System Description.

In another preferred embodiment of the present invention, misleading and conflicting information is inserted into the TOC of multiple sessions on the disk. For example, the TOC of data session 26 may contain the same track numbers as audio session 24, while indicating different start times for the tracks and/or different, non-audio modes. As an example, Table II below shows information appearing in the lead-in areas of an audio session and a data session on a multi-session CD. The audio session contains tracks 1-4, while the data session contains track 5. The data session TOC is modified, however, so that it refers to tracks 1-4 and contains misleading information regarding the location and content of theses tracks.

TABLE II

MULTI-SESSION TOC

| Audio session | | | Data session | | |
|---|---|---|---|---|---|
| Track | Start | Mode | Track | Start | Mode |
| 1 | 00.00.00 | Audio | 1 | 00.01.00 | Digital |
| 2 | 04.30.00 | Audio | 2 | 04.33.00 | Digital |
| 3 | 09.15.00 | Audio | 3 | 09.20.00 | Digital |
| 4 | 12.50.00 | Audio | 4 | 12.57.00 | Digital |

Since a CD audio player reads only the audio session, along with its TOC and other control information, it will ignore the duplicate track numbers in the data session TOC. On the other hand, many computer CD drives (particularly newer models) read and map the entire TOC structure of all the sessions into the computer memory and check the structural integrity of the disk before proceeding to access the content of the disk. The conflicting track information will cause an error to be returned when the computer attempts to access the audio tracks.

In order to enable an authorized user to play the audio content of protected disk 20 on a computer CD drive, a replica of the original content is preferably stored on the disk in an encoded or otherwise hidden form, which only an authorized user is able to access. The replica content is compressed and protected using means known in the art, such as encryption or DRM techniques. The replica content is recorded on disk 20, preferably in a data session on the disk. Alternatively, the replica content may be hidden in the audio tracks of a CD-DA (Red Book) disk in various locations, as described below.

The replica content is arranged so as to allow playback by a CD drive, preferably using dedicated player software provided on disk 20, or alternatively using authorized player software provided to the user's computer. This authorized software may be in the form of a plug-in to an existing media player. The software provides the computer with specific instructions regarding where to find the replica data on disk 20 and how to decode it for playback. Preferably, the player software reads, decrypts and decompresses the replica content in memory, section by section, so that there is no buffer of clear audio data that a hacker can grab optionally, only CD drives that are configured in advance to read the hidden content can be used for this purpose. The existence of the replica content on the disk in the correct location and format can itself be used for authenticating the disk.

The replica content may be "hidden" on disk 20 in any of a variety of locations:

- In data session 26, as mentioned above.
- In an additional audio track in the audio program area of the disk, preferably located after all the original audio tracks and hidden by manipulating the TOC.
- In a second audio session added to the disc. The replica content is preferably placed in the pregap area of the second audio session (which can be as long as desired), optionally followed by a very short real audio track containing silence. Alternatively, the replica content may be stored in a hidden track in the second audio session.
- In sub-code channels (R, S, T, U, . . . ) that are not used in the CD-DA format. The replica content is preferably compressed and encoded in a way that does not interfere with information recorded in these channels in other CD formats, such as CD text.

Preferably, regardless of the location chosen to store the replica content, the bit structure of the recorded replica content complies with the Red Book standard (although the actual bits are not audio samples, but are rather data portions of the hidden replica). Upon reading the replica content, the authorized player software assembles the data bits into bytes, decompresses and/or decrypts the data, and then plays back the content.

In still another preferred embodiment of the present invention, the synchronization pattern S0-S1 is inverted and repositioned, so that S0 appears after S1 and they are no longer consecutive. Preferably, the original S0 and S1 are overwritten with arbitrary data. S1 and S0 are then rewritten, preferably in frames N and N+3 (N<95), respectively, or the modified sector. Most preferably, the inversion and repositioning of S0 and S1 are repeated in one or more different groups o consecutive sectors, wherein the groups are not necessarily uniform in size. A CD audio player is typically able to synchronize its reading of the EFM symbols on the disk even when it loses the S0-S1 pattern. A computer CD drive, however, will seek the standard S0-S1 synchronization pattern, and when it is unable to find it, will typically fail in synchronizing its reading of the disk.

In preferred embodiments of the present invention, one or more of the modifications described above are implemented on CD 20 by operation of a protection module on the data to be written to the CD. Other modifications may also be applied, such as those described In the references cited in the Background of the Invention. The protection module may be implemented as a hardware unit or as a software program, or as a combination of hardware and software elements. Two exemplary embodiments of the module are shown in the figures that follow, but alternative embodiments will be apparent to those skilled in the art and are considered to be within the scope of the present invention.

Figure 2:
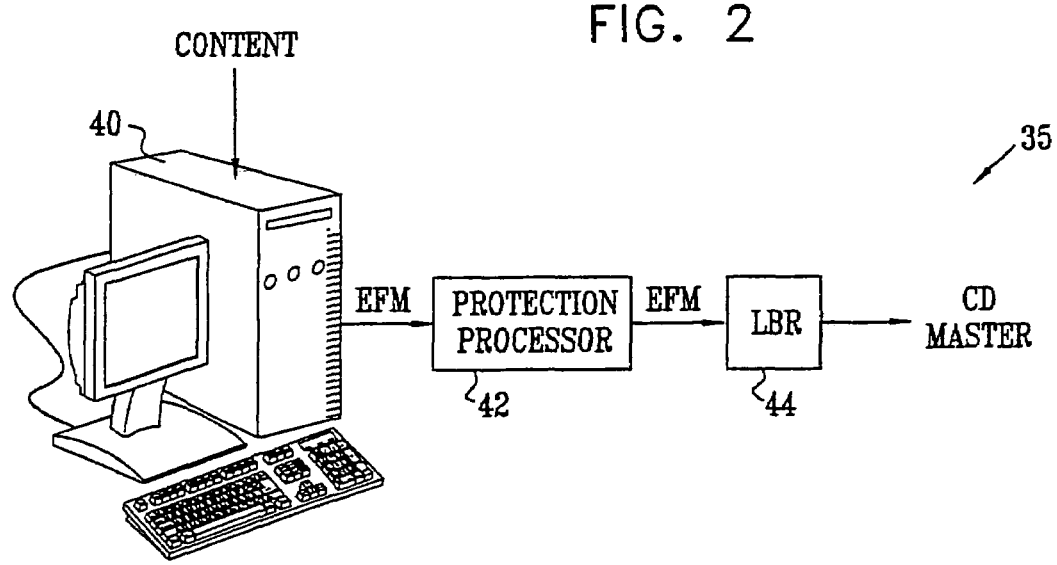
FIG. 2 is a block diagram that schematically illustrates CD recording equipment, in accordance with a preferred embodiment of the present invention.

FIG. 2 is a block diagram that schematically illustrates apparatus 35 used for producing CDs that are resistant to unauthorized copying, in accordance with a preferred embodiment of the present invention. Apparatus 35 is used to produce a CD master mold from digital audio content. The CD master is then used in stamping CD 20, based on manufacturing methods well known in the art. Alternatively, digital video disks (DVD) may be produced in like manner.

Audio content that is input to apparatus 35 is processed by a digital processing station 40, as is known in the art. Station 40 organizes the layout of the content on the disk and generates the required control information. The station then converts the eight-bit digital data into a modulated stream of fourteen-bit EFM symbols, in which the symbols are formatted in blocks and frames for CD recording, preferably as specified by the Red Book standard. If the data input to station 40 do not already include appropriate error correcting codes, such codes are also computed by the station and are interleaved with the audio data as dictated by the standard.

The EFM data stream is passed to a protection processor 42, which serves as the protection module in apparatus 35. Processor 42 alters aspects of the data to be written to the CD master. The operation of processor 42 typically (although not necessarily) includes both modifications to the symbols and/or audio data to be written to the disk and changes in the disk layout and/or in the logical and control information on the disk, as described above. The data from protection processor 42 are passed to a laser beam recorder (LBR) 44, which writes the data to a CD master, as is known in the art. As a result of the modifications introduced by processor 42, audio sessions on disks made from the CD master will play normally on CD audio players, but will either fail to load entirely on computer CD drives or will return errors when read using such drives.

Figure 3:
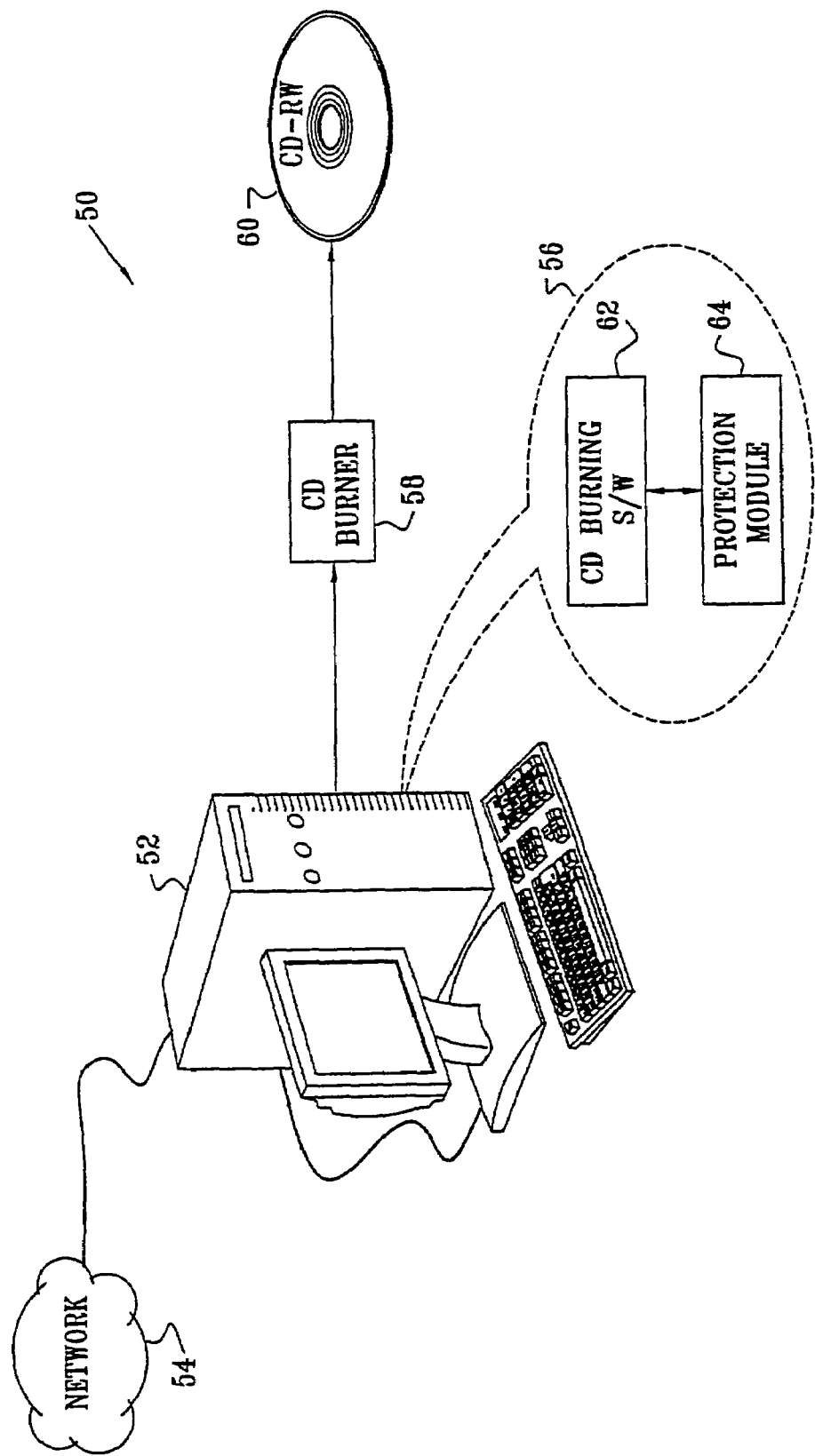
FIG. 3 is a partly pictorial block diagram that schematically illustrates a system for CD recording, in accordance with a preferred embodiment of the present invention.

FIG. 3 is a block diagram that schematically illustrates apparatus 50 used for producing CD-R (and CD-RW) disks that are resistant to unauthorized copying, in accordance with another preferred embodiment of the present invention. A personal computer 52 is configured to download content, such as audio files, from a network 54. The computer is equipped with CD copying software 56, which it uses to arrange and encode the content and to drive a CD burner 58 to record the content on a disk 60, such as a CD-RW disk. The components of software 56 may be downloaded to computer 52 in electronic form, from network 54, for example, or they may alternatively be supplied on tangible media, such as CD-ROM.

Software 56 is configured to apply one or more of the modifications described above to the content and control information that are written to disk 60, so that the audio content on the disk can be played on a CD audio player, but cannot be copied again. For this purpose, in addition to a CD burning program 62, copying software 56 preferably includes a protection module 64, as well. Typically, CD burning program 62 comprises a conventional software package, such as the above-mentioned Roxio "Easy CD Creator," which is modified to communicate with protection module 64 using a predefined protocol. Details of this protocol are described below with reference to FIG. 4. In accordance with the protocol, the protection module passes control information to burning program 62, which applies the information in generating its output to CD burner 58.

FIG. 4 is a flow chart that schematically illustrates a method for generating protected content for writing on disk 60, by interaction between burning program 62 and protection module 64, in accordance with a preferred embodiment of the present invention. The method is initiated whenever a user of computer 52 invokes burning software 62, at an invocation step 70. Burning program 62 receives content to be written to disk 60, at a content preparation step 72. The content may be downloaded from network 54 or read from media such as an original audio CD. Preferably, when computer 52 receives content that is subject to copyright or other license, the content includes a flag, field, DRM wrapper or other means to indicate to computer 52 that the content should be copy-protected, at a protection checking step 74. Alternatively, the user of the computer may indicate to the software that the content about to be recorded on disk 60 should be copy-protected. The protection may apply to the entire disk, or only to a selected track or session on the disk.

When burning program 62 determines that an item of content requires protection, at step 74, it invokes protection module 64. The burning program first asks the protection module to authenticate itself, at an authentication step 76. The protection module may likewise require authentication from the burning program. Any suitable method known in the art may be used for this purpose, such as methods based on a public key infrastructure (PKI). The authentication is useful in preventing hacking of either program 62 or module 64, which could lead to unauthorized copying of the content. Once the protection module is authenticated, the burning program passes it the Table Of Contents (TOC) and/or other relevant control information with respect to the contents of the disk, at a TOC passing step 78. This information enables the protection module to analyze the logical structure of the content to be recorded on the disk. Based on the analysis, the protection module prepares a sequence of control bytes that will instruct the burning program to modify specific elements of the data to be recorded on the disk.

When these preparations are complete, burning program 62 sends a sync signal to protection module 64, at a synchronization step 80, and enters a receive-data mode. The sync signal indicates to the protection module that the program is ready to receive the control bytes, and also provides a timing reference so that the module can synchronize itself with the flow of data generated by the burning program for writing to the disk. There is no need, however, for the actual content to be passed to the protection module, or for the protection module to interface with the different file formats or data encoding schemes handled by the burning program. The protection module passes the control bytes it has prepared to the burning program, in the proper time alignment with the disk content, at an information sending step 82. Burning software 62 combines the control bytes with its own stream of content data (taking advantage of the synchronization between the control bytes and data), at a data combination step 84, so that the content is protected from unauthorized copying by modifications made to the logical and control information on the disk. The burning software then writes the combined data via CD burner 58 to disk 60, at a disk writing step 86.

FIG. 5 is a flow chart that schematically illustrates a method for updating a protection module used to apply copy protection to CDs, in accordance with a preferred embodiment of the present invention. This method may be used with substantially any protection module that is programmable, whether the module is implemented in software, such as module 64 (FIG. 3), or in hardware, such as protection processor 42 (FIG. 2). It allows a supplier of such protection modules to periodically update the algorithms and parameters applied by the module in copy-protecting CD content, so as to provide more secure protection against hacking and piracy.

For the sake of illustration, the method of FIG. 5 is described here with reference to apparatus 50, shown in FIG. 3. When an update to protection module 64 has been created at the supplier's facility, it is prepared in the form of a script file and encrypted by a suitable method, such as PKI. The encrypted file is then downloaded from network 54 to computer 52, at a download step 90. The script file and protection module are mutually authenticated, at an authentication step 92. The authentication is meant to prevent a hacker from discovering or tampering with the algorithms that are used in the copy protection applied by the module. Once the script file is authenticated, computer 52 decrypts it, at a decoding step 94.

The computer then runs the script, which automatically updates the program code of the protection module, at a running step 96. Typically, the script changes the values of certain parameters used by the protection module in calculating the modifications to be made to the data for recording on disk 60, such as numbers of tracks or time intervals to be skipped. Alternatively or additionally, the script may actually change the way the protection program runs. Once the update is complete, the changes in the parameters and/or the program itself are implemented the next time the protection module is used.

Although preferred embodiments are described hereinabove with reference to compact disk (CD) media and recording standards, those skilled in the art will understand that the principles of the present invention may be applied to other computer data storage media, such as digital video disks (DVD) in particular, and to other recording standards. These principles may be adapted not only for audio data and software programs as described hereinabove, but also for other types of multimedia data, such as video and text. Furthermore, although in the described embodiments, certain specific types of data distortions and run-time errors are used, those skilled in the art will realize that other types of errors may also be introduced in original or duplicated media for similar copy-prevention purposes.

It will thus be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for copy protection of a recording medium, the method comprising:

receiving data in a recording module representing content to be recorded on the recording medium, the data including an indication that the content is to be protected from unauthorized copying;

responsive to the indication, signaling a protection module to initiate a protection protocol in synchronization with the recording module;

conveying to the protection module sub-code channel information containing Program Memory Area (PMA) data for skipping at least part of a track of protected content on playback;

generating control information using the sub-code channel information by the protection module so as to cause an unauthorized readout device to skip the at least part of a track of protected content during playback, to prevent the unauthorized copying of the content that is to be protected;

conveying the control information from the protection module to the recording module, in accordance with the protocol;

combining the control information with the data representing the content in the recording module; and recording the data combined with the control information on the recording medium.

2. A method according to claim 1, wherein generating the control information comprises generating the control information responsive to the sub-code channel information, substantially without receiving the data representing the content at the protection module.

3. A method according to claim 1, wherein signaling the protection module comprises sending a synchronization signal from the recording module to the protection module, and wherein conveying the control information comprises generating the control information in synchronization with the data, responsive to the synchronization signal.

4. A method according to claim 1, wherein signaling the protection module comprises authenticating the protection module before proceeding with the protection protocol.

5. A method according to claim 1, wherein generating the control information comprises preparing the control information so as to cause the recording module, upon combining the control information with the data, to effect logical changes in a sub-code channel associated with the data.

6. A method according to claim 1, wherein generating the control information comprises preparing the control information so as to cause the recording module, upon combining the control information with the data, to modify the data so that at least a portion of the data will be identified as erroneous with respect to an error correcting code associated therewith.

7. A method according to claim 1, wherein the recording medium comprises a compact disk (CD).

8. Apparatus for copy protection of a recording medium, the apparatus comprising:
 a protection module, adapted:
  to receive sub-code channel information containing Program Memory Area (PMA) data for skipping at least part of a track of protected content on playback,
  to generate control information by using the sub-code channel information so as to cause an unauthorized readout device to skip the at least part of a track of protected content during playback to prevent unauthorized copying of protected content, and
 a recording module, adapted:
  to receive data representing the content to be recorded on the recording medium, the data including an indication that the content is to be protected from the unauthorized copying,
  responsively to the indication, to signal the protection module to initiate a protection protocol in synchronization with the recording module,
  to conveys the control information from the protection module to the recording module, in accordance with the protocol,
  to receives the control information generated by the protection, module, and
  to combines the control information with the data representing the content, so as to record the data combined with the control information on the recording medium.

9. Apparatus according to claim 8, wherein the protection module is adapted to generate the control information responsive to the sub-code channel information, substantially without receiving the data representing the content.

10. Apparatus according to claim 8, wherein the recording module is adapted to send the protection module a synchronization signal, and wherein the protection module is adapted to generate the control information in synchronization with the data, responsive to the synchronization signal.

11. Apparatus according to claim 8, wherein the recording module is adapted to authenticate the protection module before proceeding with the protection protocol.

12. Apparatus according to claim 8, wherein the protection module is adapted to prepare the control information so as to cause the recording module, upon combining the control information with the data, to effect logical changes in a sub-code channel associated with the data.

13. Apparatus according to claim 8, wherein the protection module is adapted to prepare the control information so as to cause the recording module, upon combining the control information with the data, to modify the data so that at least a portion of the data will be identified as erroneous with respect to an error correcting code associated therewith.

14. Apparatus according to claim 8, wherein the recording medium comprises a compact disk (CD).

15. Apparatus according to claim 8, wherein the apparatus comprises a programmable processing unit, and wherein the recording and protection modules are implemented as processes running on the processing unit.

16. A computer software product comprising a computer-readable medium in which program instructions are stored, which instructions, when read by a computer, cause the computer to run a protection process and a recording process for recording protected content on a recording medium, wherein:
 the protection process:
  receives sub-code channel information containing Program Memory Area (PMA) data for skipping at least part of a track of protected content on playback, and
  generates control information by using the sub-code channel information so as to cause an unauthorized readout device to skip the at least part of a track of protected content during playback, to prevent unauthorized copying of protected content,
 and wherein:
 the recording process:
  receives data representing the content to be recorded on the recording medium, the data including an indication that the content is to be protected from the unauthorized copying,
  signals the protection process to initiate a protection protocol in synchronization with the recording process, conveys the control information from the protection process to the recording process in accordance with the protocol,
  receives the control information generated by the protection process,
  combines the control information with the data representing the content, and
  records the data representing the content combined with the control information on the recording medium.

17. A product according to claim 16, wherein the instructions cause the protection process to generate the control information responsive to the sub-code channel information, substantially without receiving the data representing the content.

18. A product according to claim 16, wherein the instructions cause the recording process to send the protection process a synchronization signal, and cause the protection process to generate the control information in synchronization with the data, responsive to the synchronization signal.

19. A product according to claim 16, wherein the instructions cause the recording process to authenticate the protection process before proceeding with the protection protocol.

20. A product according to claim 16, wherein the instructions cause the protection process to prepare the control information so as to cause the recording process, upon combining the control information with the data, to effect logical changes in a sub-code channel associated with the data.

21. A product according to claim 16, wherein the instructions cause the protection process to prepare the control information so as to cause the recording process, upon combining the control information with the data, to modify the data so that at least a portion of the data will be identified as erroneous with respect to an error correcting code associated therewith.

22. A product according to claim 16, wherein the recording medium comprises a compact disk (CD).

* * * * *